July 2, 1957  E. A. RING  2,797,617
ADJUSTABLE TEMPLES FOR EYEGLASS OR SPECTACLE FRAME
Filed July 20, 1953
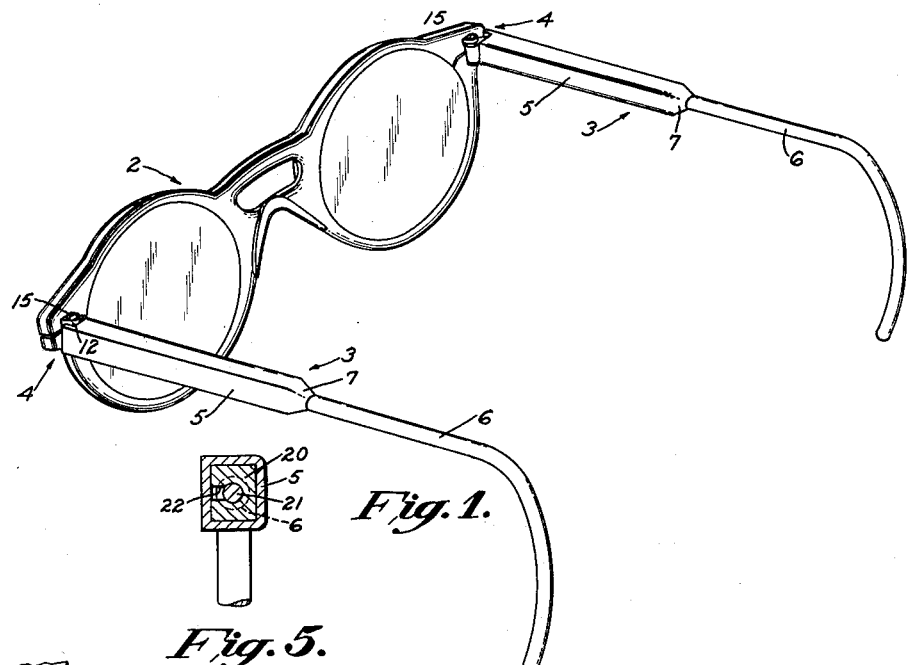
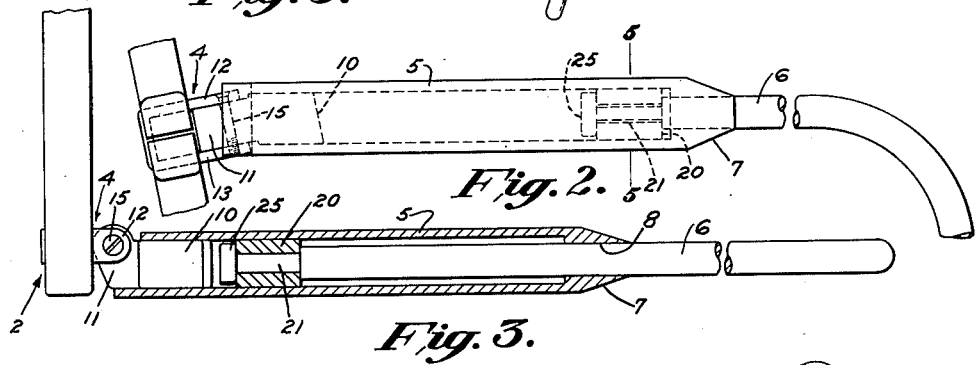
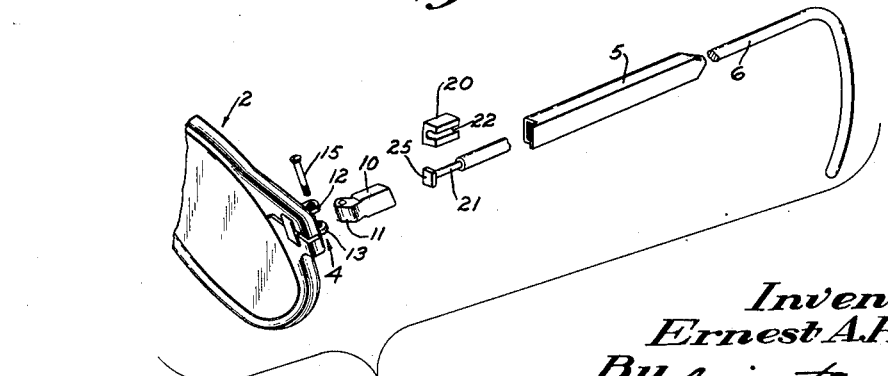
Inventor:
Ernest A. Ring
By Attorneys.

United States Patent Office 2,797,617
Patented July 2, 1957

2,797,617

ADJUSTABLE TEMPLES FOR EYEGLASS OR SPECTACLE FRAME

Ernest A. Ring, Providence, R. I., assignor of one-half to Francis M. Blakeney, Cranston, R. I.

Application July 20, 1953, Serial No. 369,116

2 Claims. (Cl. 88—52)

This invention relates to eyeglass and spectacle frames, and particularly to improvements in adjustable temples for such frames.

As herein shown the invention is applied to a non-metallic spectacle frame with non-metallic temples which may be readily and conveniently adjusted in length to fit the face of the wearer.

One object of the invention is to provide an adjustable temple of telescopic construction in which the hooked element of the temple may be extended for lengthening it or retracted to shorten it.

Another object is to provide a temple of the type specified constructed of non-metallic material, such as zylonite or similar plastic, and in which the adjustable parts of the temple are held frictionally after adjustment for altering the length of the temple.

Another object is to provide a spectacle frame having temples which are universally adjustable both as to length and in the lateral relationship of their hooked ends to adapt them to properly fit the face of the wearer and render them more comfortable to wear.

Another object is to provide a temple-structure of the type indicated which is strong and durable in use and at the same time highly ornamental and pleasing in appearance.

Another object is to provide a temple of the type indicated which is relatively simple in structure, economical to manufacture, and free from extraneous parts liable to mar its ornamental appearance.

Further objects of the invention are set forth in the following specification which describes a preferred form of construction of the improved temple as illustrated, by way of example, in the accompanying drawing. In the drawing:

Fig. 1 is a perspective view of a conventional type of spectacle frame showing the present improved adjustable temples applied thereto;

Fig. 2 is an enlarged side elevational view of a temple embodying the present improved construction;

Fig. 3 is a similarly enlarged view showing the telescopic structure of the adjustable elements of the device in section;

Fig. 4 is an exploded or disassembled perspective view showing an end portion of the spectacle frame, the several parts of the improved temple, and its hinge element; and Fig. 5 is an enlarged transverse sectional view of the joint between the telescopic elements of the temple, taken on line 5—5 of Fig. 2 to illustrate the slidable friction means for controlling the adjustment between the two elements of the temple.

Referring to the drawing, Fig. 1 shows a spectacle frame 2 of conventional design to which the temples 3 are connected by hinge-elements 4 at their ends, each temple being constructed in two sections 5 and 6 with the main section hinged to the frame and the outer hooked-end section telescopically connected thereto for slidable adjustment therein.

Referring to Fig. 2, the main hinged section 5 of the temple may be of rectangular shape in cross-section or in other instances it may be formed with any other suitable contour. The hinged section 5 is of hollow or tubular construction and preferably has a square or rectangular bore extending from its inner hinged end to its outer end which is tapered at 7 and formed with a cylindrical bore 8 adapted to fit closely around the straight cylindrical end of the adjustable section 6.

Referring more particularly to Figs. 4 and 5, the tubular section 5 of the temple may receive a plug 10 at its end closely fitting its interior and cemented or otherwise secured fixedly therein. The plug 10 forms a part of the hinge-joint, being provided with a lug 11 adapted to fit between spaced ears 12 and 13 on the hinge-member 4 for pivotal connection therewith by means of the usual pin or screw 15. It is desirable that the temples of the spectacle be so mounted that their hooked portions may be adjusted laterally by turning or rotating their cylindrical portions 6 in the bore 8 at the end of the member 5 so that they can be inclined to the vertical to assume the most comfortable position between the cartilage of the ear and the side of the wearer's head. During this latter adjustment the reduced portion 21 of the member 6 rotates in the opening 22 of the slider 20 against the frictional resistance of the slider which acts to retain the member 6 in its adjusted relationship.

The means for connecting the two sections 5 and 6 of the temple for telescopic adjustment and for retaining them in adjusted relationship consists in a friction-element, preferably constructed of resilient material in the form of a plug-like "slider" 20. The slider-block 20 may be constructed of yieldable or resilient material such as uncured plastic capable of expansion for frictionally engaging the inner walls of the tubular section 5. For connecting the slider 20 to the end of the adjustable section 6 the end of the latter is reduced in diameter at 21 to form a portion adapted to be sprung into a slot 22 in the side of the slider 20. The portion 21 of the member 6 is so dimensioned as to cause it to expand the bifurcated sides of the slider 20 to cause it to frictionally engage with the upper and lower relatively flat faces on the interior of the member 5. At the end of the reduced portion 21 of the temple member 6 the material is formed with a rectangular abutment or terminal portion 25 which engages the end of the slider-block 20 for operatively connecting it to the temple member 6. The abutment 25 may take a different shape but by forming it of rectangular configuration it serves to limit the turning movement or rotation of the temple member 6 within the member 5 during turning of the member 6 for adjusting the angular relationship of its hooked ends. Thus the member 6 is prevented from being turned completely around or beyond the proper range of adjustment of its hooked end. Furthermore, the frictional engagement of the slider 20 with the reduced portion 21 of the member 6 acts to retain it in fixed relationship after its hooked end has been angularly adjusted.

With the parts of the adjustable temple connected in the manner explained above the expansion of the block or slider 20 will cause the latter to exert sufficient frictional adherence to the opposed sides of the interior of the member 5 to resist accidental sliding movement of the member 6 subsequent to its adjustment for either shortening or extending the overall length of the temple.

As will be noted by reference to Figs. 2 and 4, the lug 11 on the hinge-element or plug 10 is slightly inclined or canted with respect to the main portion of the plug so that the temple is connected at a slight downward inclination to the frame 2 as is the usual arrangement for joining the temples to a spectacle frame.

As herein illustrated the two adjustable elements 5 and 6 of the improved temple are preferably constructed of zylonite or similar plastic material, but in other cases one or both may be made of metal or other material. On the other hand, the slider-plug 20 being constructed of uncured plastic or other similar resilient material will have a co-efficient of friction sufficient to cause it to cling to the inner walls of the tubular member 5 with which it engages while at the same time being longitudinally slidable therein when any considerable force is exerted to telescope the temple member 6 relatively to the member 5 for either shortening or extending the overall length of the temple.

It has been found in practice that with the present form of construction and by use of the preferred type of materials herein specified, a very effective connection is made between the slider 20 and the interior of the member 5 so that the slider operates to hold the telescopic member 6 in its adjusted relationship while still permitting telescopic movement between the parts so that the temple may be readily adjusted to fit the requirements of the wearer. The type of materials herein specified as used for the improved temple structure may be varied, however, by constructing the hinged member 5 as a metal tube, the adjustable member 6 of wire, and the slider plug 20 of any suitable material having a co-efficient of friction to adapt it to cling tenaciously to the sides of the interior of the tubular member while still allowing it to slide longitudinally therein.

While the present improved temple is herein described and illustrated as embodied in a preferred form of construction, it is obvious that the parts may take other forms and shapes and be constructed of different materials without departing from the spirit or scope of the invention as defined in the accompanying claims. Therefore, without limiting myself in this respect, I claim:

1. An adjustable temple for eyeglass and spectacle frames comprising a tubular member constructed of plastic material with a longitudinal bore of relatively large rectangular cross-section and a smaller bore at one end, means at the opposite end of said tubular member for pivotally connecting it to a spectacle frame, an extension member slidable through said smaller bore to telescope within said tubular member, said extension member formed at its inner end with a portion of reduced diameter providing shouldered abutments at its ends, and a block-like slider of bifurcated form slotted transversely to adapt its sides to contract laterally, said slider being of greater thickness laterally than the width of the bore in the tubular member, said slider being mounted on the reduced portion of said extension member and held longitudinally thereof by said abutments, and said slider being contracted laterally within the rectangular bore of said tubular member to cause it to expand into frictional engagement with the opposite inner walls thereof to releasably retain said extension member in different positions of adjustment longitudinally of said tubular member.

2. An adjustable temple for eyeglass and spectacle frames comprising a tubular member constructed of plastic material with a longitudinal bore of relatively large rectangular cross-section and a smaller bore at one end, an extension member slidable through said smaller bore to telescope within said tubular member, said extension member formed at its inner end with a portion of reduced diameter providing shouldered abutments at its ends, a block-like slider constructed of plastic material slotted transversely to adapt it to contract laterally, said slider being of greater thickness laterally than the width of the bore in the tubular member, said slider being mounted on the reduced portion of said extension member and held longitudinally thereof by said abutments, said slider being contracted laterally within the rectangular bore of said tubular member to cause it to expand into frictional engagement with the opposite inner walls thereof for releasably retaining said extension member in different positions of adjustment longitudinally of said tubular member, and a block-like hinge-member secured in the end of said hollow member for pivotally mounting it on a spectacle frame.

References Cited in the file of this patent

UNITED STATES PATENTS

| Number | Name | Date |
|---|---|---|
| 27,359 | Gordon et al. | Mar. 6, 1860 |
| 1,769,004 | Turse | July 1, 1930 |
| 2,112,644 | Bausch | Mar. 29, 1938 |
| 2,481,271 | Willey | Sept. 6, 1949 |
| 2,503,997 | Miller | Apr. 11, 1950 |
| 2,576,778 | Cook | Nov. 27, 1951 |

FOREIGN PATENTS

| Number | Country | Date |
|---|---|---|
| 335,458 | Great Britain | Sept. 25, 1930 |
| 524,794 | Germany | May 12, 1931 |